June 8, 1926.
J. L. OPITZ
1,587,797
CULTIVATOR ATTACHMENT FOR TRACTORS
Filed March 31, 1924     2 Sheets-Sheet 1
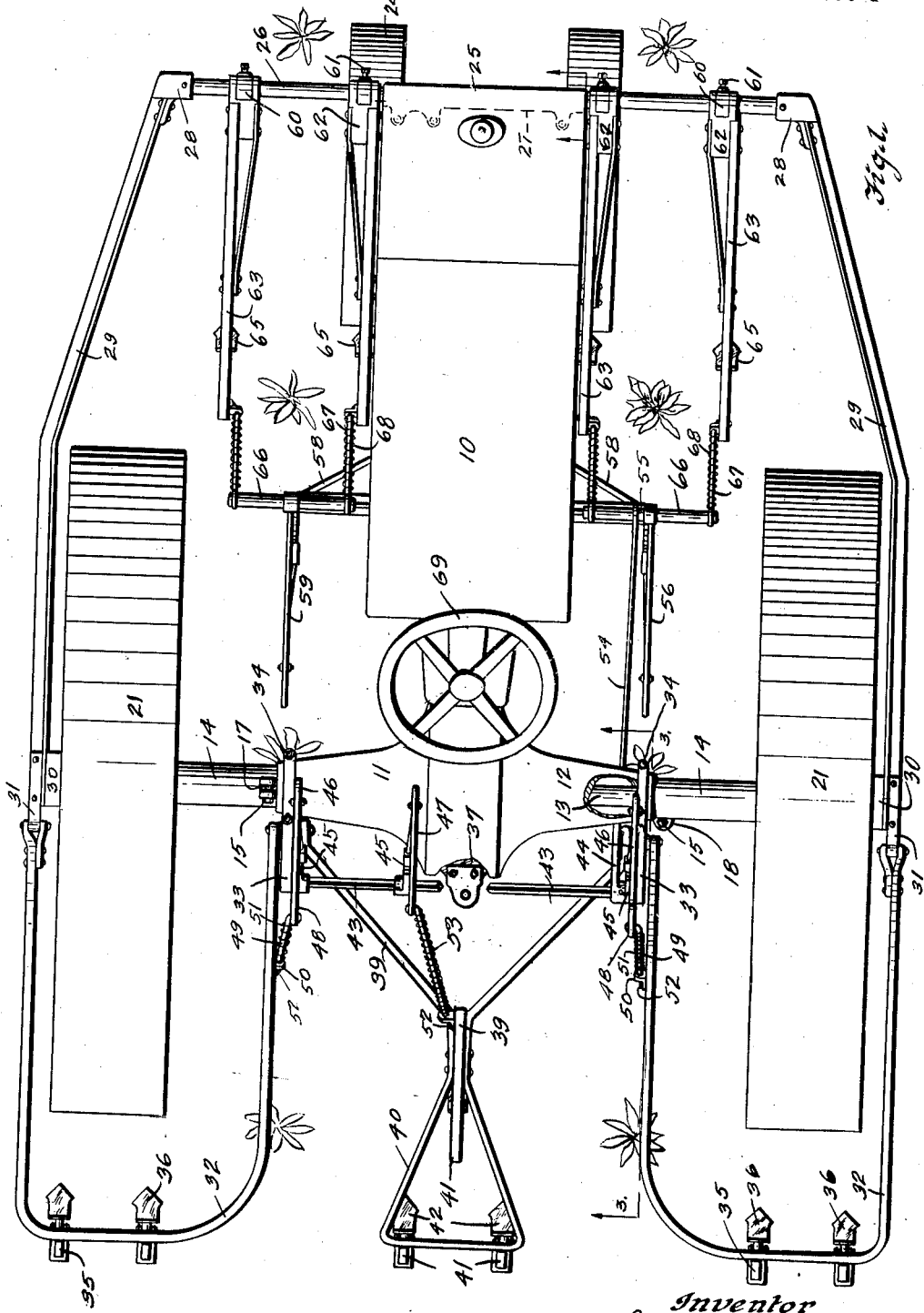
Inventor
John L. Opitz
by Craig & Hague, Attys.

June 8, 1926.
J. L. OPITZ
1,587,797
CULTIVATOR ATTACHMENT FOR TRACTORS
Filed March 31, 1924   2 Sheets-Sheet 2
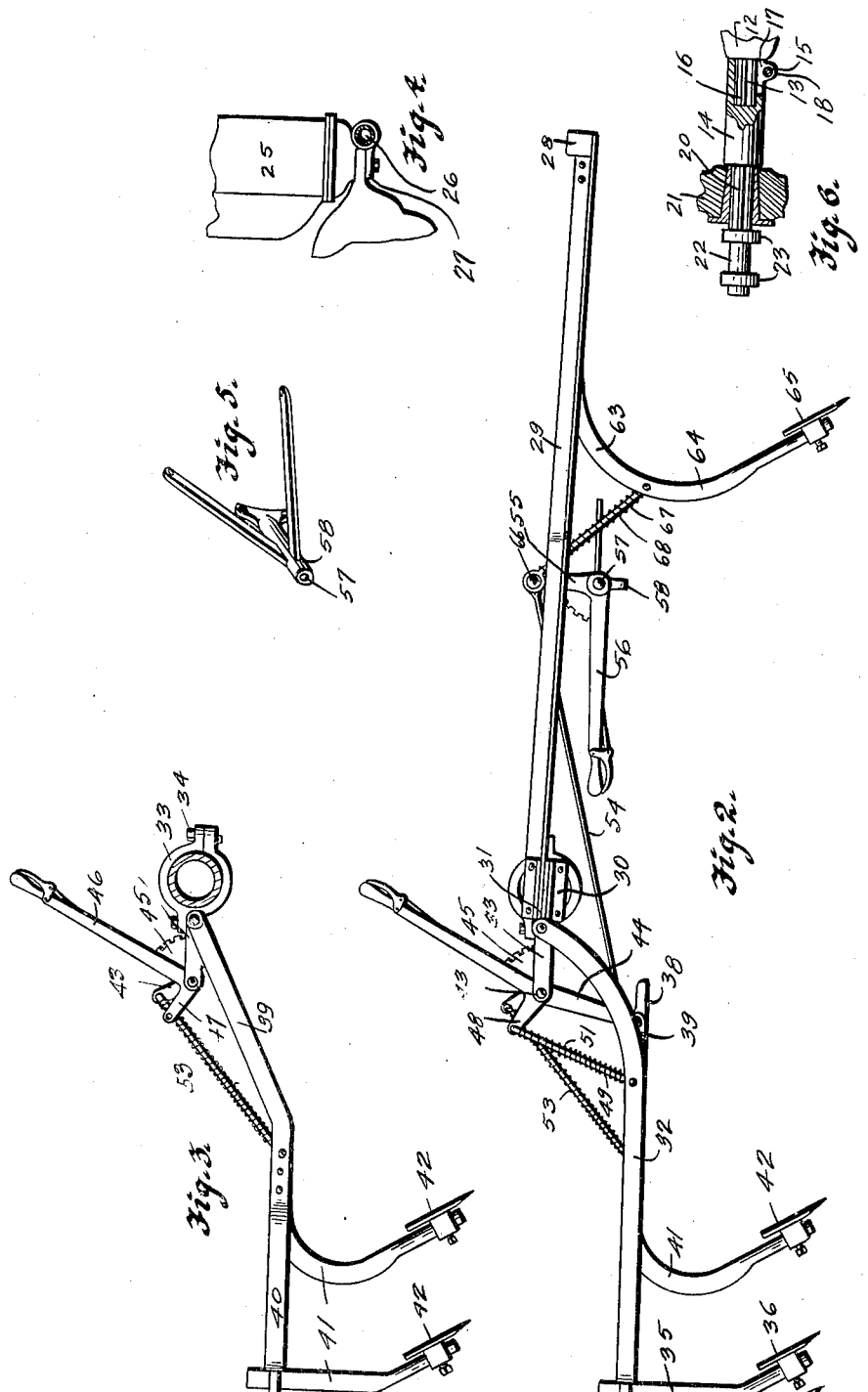

Patented June 8, 1926.

1,587,797

UNITED STATES PATENT OFFICE.

JOHN LOUIS OPITZ, OF CLARINDA, IOWA.

CULTIVATOR ATTACHMENT FOR TRACTORS.

Application filed March 31, 1924. Serial No. 703,152.

The object of my invention is to provide a new and improved cultivator attachment for tractors of simple, durable and inexpensive construction.

A further object is to provide in a cultivator attachment for tractors, new and improved means for increasing the distance between the tractor wheels so that they may be made to straddle two rows of plants.

A further object is to provide in a cultivator attachment for tractors, an improved arrangement of shovels relative to the tractor frame, and means for elevating and lowering the same.

A further object is to provide in a detachable cultivator attachment for tractors, improved means for fixing the attachment thereto.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a plan view of my improved cultivator device showing the manner in which it is attached to a tractor.

Figure 2 is a slide elevation of the cultivator attachment as detached from the tractor.

Figure 3 is a detail sectional view taken on the line 3—3 of Figure 1.

Figure 4 is a detail sectional view taken on the line 4—4 of Figure 1.

Figure 5 is a detail view of one of the supporting brackets.

Figure 6 is a detail view of my extension axle.

The numeral 10 indicates the body portion of a tractor and 11 the gear housing, which is provided with axle housings 12. Each of the axle housings 12 is provided with an axle 13 of the ordinary construction, and which are designed to carry the tractor wheels. The wheels, however, have been removed and I have provided an extension axle 14 which comprises a cylindrical portion 15 having an opening 16 in one end formed fluted to mate with the fluted portion of the axle 13, so that said sleeve and axle will be driven in unison.

One side of the sleeve 16 is provided with a slot 17 and also a pair of lugs 18 designed to receive a set screw 19. This provides means whereby the sleeve may be rigidly secured to the shaft by simply tightening the set screw after it has been placed in position. The outer end of the member 15 is provided with a smaller axle portion 20 which is also fluted and which is designed to carry the wheels 21. The member 20 is provided with an extension 22 on which is mounted the roller bearings 23.

By this arrangement I have provided means whereby the space between the wheels 21 may be increased to such an extent that the two rows of corn or similar plants may be straddled with a tractor.

The forward end of the tractor is provided with a short axle such as illustrated and described in my issued patent dated September 25, 1923, Number 1,468,669, which permits wheels 24 to be mounted between the two rows of corn.

Secured to the under edge of the radiator 25 I have provided a transversely arranged shaft 26 secured in position by means of a suitable bracket 27. Each end of said shaft if provided with a bracket 28, each of which is designed to carry a frame member 29, each of which extends substantially horizontally and inclined outwardly and then rearwardly. The rear end of each of the members 29 is secured to a bearing member 30, said bearing members being designed to receive the roller bearings 23 on the outer end of the axle 14.

Each of the bearing members 30 is provided with a pivot member 31 to which a substantially U-shaped beam 32 is pivoted. One of the members of said beams is designed to extend on the outside of the wheel 21, while the other one extends adjacent to the inner side of said axle. The inner ends of said beams are pivoted to a bracket 33 clamped to the outer end of the axle housing 12, as clearly shown in Figures 1 and 3, by suitable bolts 34. The pivot members of the bracket 33 are in transverse alinement with the pivot members of the brackets 31, so that the closed end of the beams is free to swing upwardly and downwardly. Each of the beams 32 is provided with a pair of shanks 35 designed to carry shovels 36.

Pivotally secured to the brackets 33 I have provided converging beam members 39. The rear ends of said beam members are provided with a triangularly shaped portion 40 designed to receive downwardly extending shanks 41, the lower end of which is provided with shovels 42 designed to go between the rows of plants, while the shovels 36 are designed to cultivate outside of the rows and behind the wheels 21.

Rotatively mounted in the brackets 33, I have provided a transversely arranged shaft 43, one end of which is provided with an arm 44 and also a series of lever sectors 45. The said shaft is also provided with levers 46 and 47, each adjacent to a corresponding sector. The lever 46 is provided with a rearwardly extending arm 48 which is designed to receive a pivoted link 49, the lower end of which is pivotally and slidably connected to a corresponding one of the beams 32 by means of a bracket 50. The links 49 are designed to receive an extensible spring 51 which will provide means for yieldably holding the beams 32 downwardly. The lower end of each of the links 49 is provided with a knob 52 to provide means whereby the beams may be elevated. A similar link 53 is provided for the beam 38 and the lever 47.

By this arrangement it will be seen that each of the beams 32 and 39 is capable of being independently elevated or lowered, and each of which may be yieldably held downwardly. The shaft 43 is rotatively mounted in its bearings and may be rotated or rocked simultaneously to lower or elevate both sets of beams 32 and the beam 39. This is accomplished through a link 54 connected to the arm 44 and also to an arm 55 of a lever 56 mounted on a shaft member 57 in the outer end of a bracket member 58. This bracket is shown in detail in Figure 5, and is designed to be secured to the engine 10 by suitable bolts.

A similar lever 59 is provided on the opposite side of the engine 10. The bar 26 is provided with collars 60 which are adjustable thereon by means of set screws 61. Each of the collars is designed to receive a pivoted bearing member 62, each of which carries a beam 63, and each of said beams having shanks 64 provided at their lower ends with shovels 65. By adjusting the collars 60 on the shaft 26, it will be seen that the shovels 65 may be set to operate at variable distances from the plants. These shovels are situated in a transverse line back of the wheels 24 and in front of the wheels 21.

The free ends of the arms 55 of the levers 56 and 59 are provided with extensions 66, each of which is provided with a pivoted link 67 similar to the links 49 and having springs 68, the lower ends of which are slidably and pivotally connected to the beams 63. This provides means whereby the rear end of the beam 63 may be elevated or lowered and held yieldably in a lowered position by the springs 67. The beams 63 on the opposite sides of the engine 10 are operated independently by means of the levers 56 and 57. It will be seen, however, that when the lever 56 is operated, the beams 32 and 39 will also be operated. The levers 56 and 59 are located in front of the driver's seat in a position where they may be easily grasped by the operator. After the shovels have all been lowered into position, either of the beams 32 or 39 may be operated independently.

It will be seen by referring to Figure 1 that the shovels 65 are mounted in front of the wheels 21 and back of the wheels 24 in such a manner that as the wheels 24 are operated by the steering mechanism, which is provided for the tractor and in which is included the steering wheel 69, the shovels 65 may be guided relative to the plants by simply guiding the front end of the tractor. The shovels 36 and 42 travel in behind the wheels 21 and at a considerable distance from the rows of plants, and need no further attention from the operator, inasmuch as they will naturally follow behind the cultivator.

By this arrangement it will be seen that I have provided a cultivator which is very short and one which may be turned around very rapidly at the end of the rows without breaking down a great deal of corn; and it will also be seen that by providing the frame members 29 attached to the outer ends of the shaft 26 and to the outer ends of the extension wheels 14, I have provided means whereby the said axles will be materially strengthened against horizontal lateral movement.

Thus it will be seen that I have provided a cultivator attachment for tractors of comparatively simple, durable and inexpensive construction, which may be easily and quickly applied to a tractor of ordinary construction by simply removing the wheels from the tractor and applying the extension axles 14, the brackets 58 and 33 and the shaft 26, and which when applied is capable of cultivating a number of rows of plants simultaneously, and having the shovels which travel close to the plants so positioned that they will be clearly visible to the operator, and also so arranged that they may be adjusted to or from the said plants.

I claim as my invention:

1. In combination with a tractor, a set of beams detachably mounted at each side of the forward end of said tractor, a series of beams pivotally mounted and extending rearwardly from said tractor, shovels for each of said beams, means for elevating and lowering the rearwardly extending beams independently, means for elevating and lowering the front beams independently, and means for simultaneously elevating all of the rearwardly extending beams and one of said front sets of beams.

2. In combination, a tractor having extensible rear axles, a frame member detachably secured to the forward end of said tractor frame having members extending rearwardly and outwardly and thence rearwardly, a bearing for the rear end of each of the rearwardly extending portions of said frame member, said bearing members being designed to rest on the outer ends of said extensible axles, a series of shovel supporting beams pivotally connected to said frame, and means for elevating and lowering said beams.

3. In combination, a tractor having extensible rear axles, a frame member detachably secured to the forward end of said tractor frame having members extending rearwardly, the rear ends of said rearwardly extending frame members being provided with bearing members designed to rest on the outer end of said extensible axles, U-shaped shovel supporting beams each having one of its ends pivotally connected to one of the rear ends of said rearwardly extending frame members, a bracket for detachably and pivotally connecting the other end of each of said U-shaped beams to said tractor frame, means carried by said brackets for elevating and lowering said U-shaped beams, a series of shovel supporting beams pivotally connected to the forward end of said detachable frame member, and means for elevating and lowering the last said beams.

4. In combination, a tractor having extensible rear axles, a frame member detachably secured to the forward end of said tractor frame having members extending rearwardly, the rear ends of said rearwardly extending frame members being provided with bearing members designed to rest on the outer end of said extensible axles, U-shaped shovel supporting beams each having one of its ends pivotally connected to one of the rear ends of said rearwardly extending frame members, a bracket for detachably and pivotally connecting the other end of each of said U-shaped beams to said tractor frame, means carried by said brackets for elevating and lowering said U-shaped beams, a series of shovel supporting beams pivotally connected to the forward end of said detachable frame member, a second pair of detachable brackets for said tractor, and means carried by the last said brackets for elevating and lowering the last said beams.

5. In combination, a tractor having extensible rear axles, a frame member detachably secured to the forward end of said tractor frame having members extending rearwardly, the rear ends of said rearwardly extending frame members being provided with bearing members designed to rest on the outer end of said extensible axles, U-shaped shovel supporting beams each having one of its ends pivotally connected to one of the rear ends of said rearwardly extending frame members, a bracket for detachably and pivotally connecting the other end of each of said U-shaped beams to said tractor frame, means carried by said brackets for elevating and lowering said U-shaped beams, a series of shovel supporting beams pivotally connected to the forward end of said detachable frame member, means for elevating and lowering the last said beams, a shovel supporting beam pivotally connected to both of said detachable brackets for said tractor frame, and means for elevating and lowering the last said beam.

6. A cultivator attachment for tractors comprising a shaft, means for detachably securing said shaft transversely with and to the forward end of a tractor, each end of said shaft being provided with a rearwardly extending frame member, a bearing member for the rear end of each of said rearwardly extending frame members, said bearing members being designed to be carried by the outer ends of the rear axles of the tractor, a U-shaped shovel supporting beam for each of the said rearwardly extending frame members having one of its ends pivotally connected thereto, the other end of each of said U-shaped beams being pivotally connected to a bracket, means for detachably connecting said brackets to the rear axle of a tractor, a shovel supporting beam pivotally connected to both of said brackets, means carried by said brackets for elevating and lowering said U-shaped beam members and the last said beam, shovel supporting beams adjustably and pivotally connected to said transverse shaft, means for elevating and lowering the last said beams, and brackets designed to be detachably secured to a tractor frame for supporting the last said elevating and lowering means.

7. A cultivator attachment for tractors comprising a frame member, means for detachably securing said frame member transversely with and to the forward end of said tractor, each end of said frame member being provided with a rearwardly extending frame member, a bearing member for the rear end of each of said rearwardly extending frame members, said bearing members being designed to be carried by the outer ends of a tractor rear axles, shovel supporting beams pivotally and adjustably connected to said transversely arranged frame member, and means for elevating and lowering said beams.

8. A cultivator attachment for tractors comprising a frame member, means for detachably connecting said frame member transversely with and to the forward end of said tractor, each end of said frame member being provided with a rearwardly extending frame member, the rear ends of said rearwardly extending frame members being provided with bearings designed to be supported by the outer ends of the rear tractor axles, a U-shaped shovel supporting beam for the rear end of each of said rearwardly extending frame members, one end of said U-shaped beam being pivotally connected thereto, a bracket pivotally connected to each of the other ends of said U-shaped beams, means for detachably connecting said brackets to the rear axle housing of a tractor, and means carried by said brackets for elevating and lowering said U-shaped beams.

9. A cultivator attachment for tractors comprising a frame member, means for detachably connecting said frame member transversely with and to the forward end of said tractor, each end of said frame member being provided with a rearwardly extending frame member, the rear ends of said rearwardly extending frame members being provided with bearings designed to be supported by the outer ends of the rear tractor axles, a U-shaped shovel supporting beam for the rear end of each of said rearwardly extending frame members, one end of said U-shaped beam being pivotally connected thereto, a bracket pivotally connected to each of the other ends of said U-shaped beams, means for detachably connecting said brackets to the rear axle housing of a tractor, a shovel supporting beam pivotally connected to both of said brackets, and means carried by said brackets for elevating and lowering said beams.

Des Moines, Iowa, March 3, 1924.

JOHN LOUIS OPITZ.